(12) United States Patent
Srinivasan et al.

(10) Patent No.: US 10,673,736 B2
(45) Date of Patent: Jun. 2, 2020

(54) TRAFFIC REDUCTION IN DATA CENTER FABRICS

(71) Applicant: Cisco Technology, Inc., San Jose, CA (US)

(72) Inventors: Sathish Srinivasan, Fremont, CA (US); Shyam Kapadia, San Jose, CA (US); Deepak Kumar, San Ramon, CA (US); Indrajanti Pallikala, San Jose, CA (US); Rohit Mendiratta, San Jose, CA (US); Lukas Krattiger, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 170 days.

(21) Appl. No.: 15/496,146

(22) Filed: Apr. 25, 2017

(65) Prior Publication Data

US 2018/0309685 A1    Oct. 25, 2018

(51) Int. Cl.
| | |
|---|---|
| *H04L 12/855* | (2013.01) |
| *H04L 12/725* | (2013.01) |
| *H04L 12/741* | (2013.01) |
| *H04L 12/46* | (2006.01) |
| *H04L 12/715* | (2013.01) |
| *H04L 29/12* | (2006.01) |

(52) U.S. Cl.
CPC ............ *H04L 45/04* (2013.01); *H04L 61/103* (2013.01); *H04L 45/302* (2013.01); *H04L 45/745* (2013.01); *H04L 61/2007* (2013.01); *H04L 61/6022* (2013.01)

(58) Field of Classification Search
CPC ... H04L 47/2466; H04L 45/302; H04L 45/04; H04L 45/745; H04L 12/4641
See application file for complete search history.

(56) References Cited

U.S. PATENT DOCUMENTS

| | | | |
|---|---|---|---|
| 6,535,498 B1 * | 3/2003 | Larsson | H04L 45/122 370/254 |
| 9,503,363 B2 * | 11/2016 | Sivabalan | H04L 45/50 |
| 9,531,627 B1 * | 12/2016 | Alvarez | H04L 45/507 |
| 10,158,564 B2 | 12/2018 | Srinivasan et al. | |

(Continued)

OTHER PUBLICATIONS

J. Rabadan, Ed., et al., "Operational Aspects of Proxy-ARP/ND in EVPN Networks", draft-ietf-bess-evpn-proxy-arp-nd-00, BESS Workgroup, Internet Draft, Apr. 4, 2016, 22 pages.

(Continued)

*Primary Examiner* — Rasheed Gidado
(74) *Attorney, Agent, or Firm* — Edell, Shapiro & Finnan, LLC

(57) ABSTRACT

A first network node of a computer network discovers a host route by leveraging a temporary host route on the control plane of the computer network. The first network node receives, from a source host, a request for a host route associated with a destination host. The first network node determines that it has not previously stored the host route associated with the destination host, and generates a temporary host route associated with the destination host. The first network node propagates the temporary host route across the control plane of the computer network, causing each respective network node to discover if the destination host is connected to the respective network node.

20 Claims, 12 Drawing Sheets

(56) References Cited

U.S. PATENT DOCUMENTS

| | | | | |
|---|---|---|---|---|
| 2004/0153520 | A1* | 8/2004 | Rune | H04L 12/4616 709/206 |
| 2005/0122955 | A1* | 6/2005 | Lin | H04L 45/04 370/351 |
| 2007/0019673 | A1* | 1/2007 | Ward | H04L 45/02 370/466 |
| 2008/0085702 | A1* | 4/2008 | Park | H04W 40/28 455/422.1 |
| 2008/0144524 | A1* | 6/2008 | Hershey | H04W 72/02 370/254 |
| 2009/0135824 | A1* | 5/2009 | Liu | H04L 45/02 370/392 |
| 2012/0044864 | A1* | 2/2012 | Zhang | H04W 40/246 370/328 |
| 2012/0195229 | A1* | 8/2012 | Chen | H04L 45/12 370/254 |
| 2013/0039218 | A1 | 2/2013 | Narasimhan et al. | |
| 2013/0176859 | A1* | 7/2013 | Stanislaus | H04W 24/04 370/242 |
| 2013/0254359 | A1 | 9/2013 | Boutros et al. | |
| 2015/0163192 | A1* | 6/2015 | Jain | H04L 61/103 370/255 |
| 2015/0208316 | A1* | 7/2015 | Mosko | H04W 40/02 370/238 |
| 2017/0012866 | A1* | 1/2017 | Balasubramanian | H04L 45/38 |
| 2017/0295130 | A1 | 10/2017 | Mahajan et al. | |

OTHER PUBLICATIONS

Blog, "OpenStack SDN—L2 Population and ARP Proxy", Networkop, https://www.google.com/url?sa=t&rct=j&q=&esrc=s&source=web&cd=1&cad=rja&uact=8&ved=2ahUKEwiZu5iSlf3gAhUqn-AKHQr9DU8QFJAAegQlChAB&url=https%3A%2F%2Fnetworkop.co.uk%2Fblog%2F2016%2F05%2F06%2Fneutron-l2pop%2F&usg=AOvVaw2z8FKO6st4k8ZNO--YdJ5K, May 6, 2016, networkop.co.uk, 7 pages.

* cited by examiner

TRAFFIC REDUCTION IN DATA CENTER FABRICS

TECHNICAL FIELD

The present disclosure relates to reducing unnecessary flood traffic in computer networks.

BACKGROUND

In certain virtual private clouds, hybrid clouds, or data center fabrics, different Layer 2 (L2) networks/sites are connected using various overlay technologies, such as Virtual eXtensible Local Area Networking (VXLAN) or Dynamic Fabric Automation (DFA), with a control plane, such as Ethernet Virtual Private Networking (EVPN). These arrangements may use different packet "flooding" techniques in order to, for example, forward packets, obtain forwarding information, etc. Packet flooding may result from, for example, use of the Address Resolution Protocol (ARP), the Dynamic Host Configuration Protocol (DHCP), the Reverse ARP (RARP), unknown unicast, Neighbor Discovery (ND) for Internet Protocol version 6 (IPv6), etc. In a data center environment, flooding of network traffic throughout a network inhibits the scalability and performance of the network.

For example, network elements in a programmable Data Center (DC) may flood ARP/ND packets to enable a source host to learn a destination host's Media Access Control (MAC) address on the same subnetwork (subnet). Once the source host obtains the MAC address of the destination host, the source host can forward any Layer 2 traffic to the destination host. ARP/ND suppression resolves flooding of ARP/ND packets within a VXLAN EVPN DC fabric, but only after the destination host is discovered. Once a host has been discovered, the network elements distribute the host's IP-MAC binding (e.g., via Border Gateway Protocol (BGP)) among the other network elements within the fabric. The directly attached network element terminates any ARP/ND requests for this host, since the network element functions as an ARP/ND proxy on behalf of the destination host.

However, the DC fabric still floods ARP/ND packets in limited cases, such as to reach a silent host, to reach a host which is dead/not responding, when a rogue host sends a subnet scanning attack to a destination host that does not exist, or when Gratuitous ARP (GARP) packets are sent for hosts when they appear on the network (e.g., initially or after a migration of a virtual machine). Additionally, in multi-fabric deployments, disaggregated VXLAN EVPN domains are interconnected by a Layer 2 (e.g., Overlay Transport Virtualization (OTV), Virtual Private LAN Service (VPLS), etc.) and Layer 3 (e.g., Multiprotocol Label Switching (MPLS), Locator/Identifier Separation Protocol (LISP), etc.) Data Center Interconnect (DCI). Typically, these domains or fabrics are connected via External BGP (eBGP) with a Layer 3 VPN using either Inter-Autonomous System (Inter-AS) option A or option B. Since the directly attached network element terminates ARP/ND requests from a host, the host MAC-IP bindings for stretched subnets of a domain are not available on other domains, thereby flooding the bridged traffic from one fabric to another fabric between hosts in the same subnet may limit ARP/ND suppression across multi-fabric deployments.

DESCRIPTION OF EXAMPLE EMBODIMENTS

Overview

Presented herein are techniques enabling a first network node of a plurality of network nodes to discover a host route by leveraging a temporary host route on the control plane of the computer network. The first network node receives, from a source host, a request for a host route associated with a destination host. The first network node determines that it has not previously stored the host route associated with the destination host, and, as a result, generates a temporary host route associated with the destination host. The first network node propagates the temporary host route across the plurality of network nodes, thereby causing each respective network node among one or more other network nodes of the plurality of network nodes to discover/determine whether the destination host is connected to the respective network node.

Additional techniques presented herein enable border network nodes to propagate host routes across computer networks. A first border network node of a first computer network receives a message from a second border network node of a second computer network. The message includes an identification of a source host on the second computer network. The first border network node generates a first host route associated with the source host in a first control plane of the first computer network. The first host route is a first type of host route, and includes the identification of the source host. The first border network node determines whether the first control plane includes a second host route of a second type of host route. The second host route includes a network address of the source host. Responsive to a determination that the first control plane does include the second host route, the first border network node associates the network address of the source host along with the identification of the source host in the first host route.

DETAILED DESCRIPTION

Figure 1:
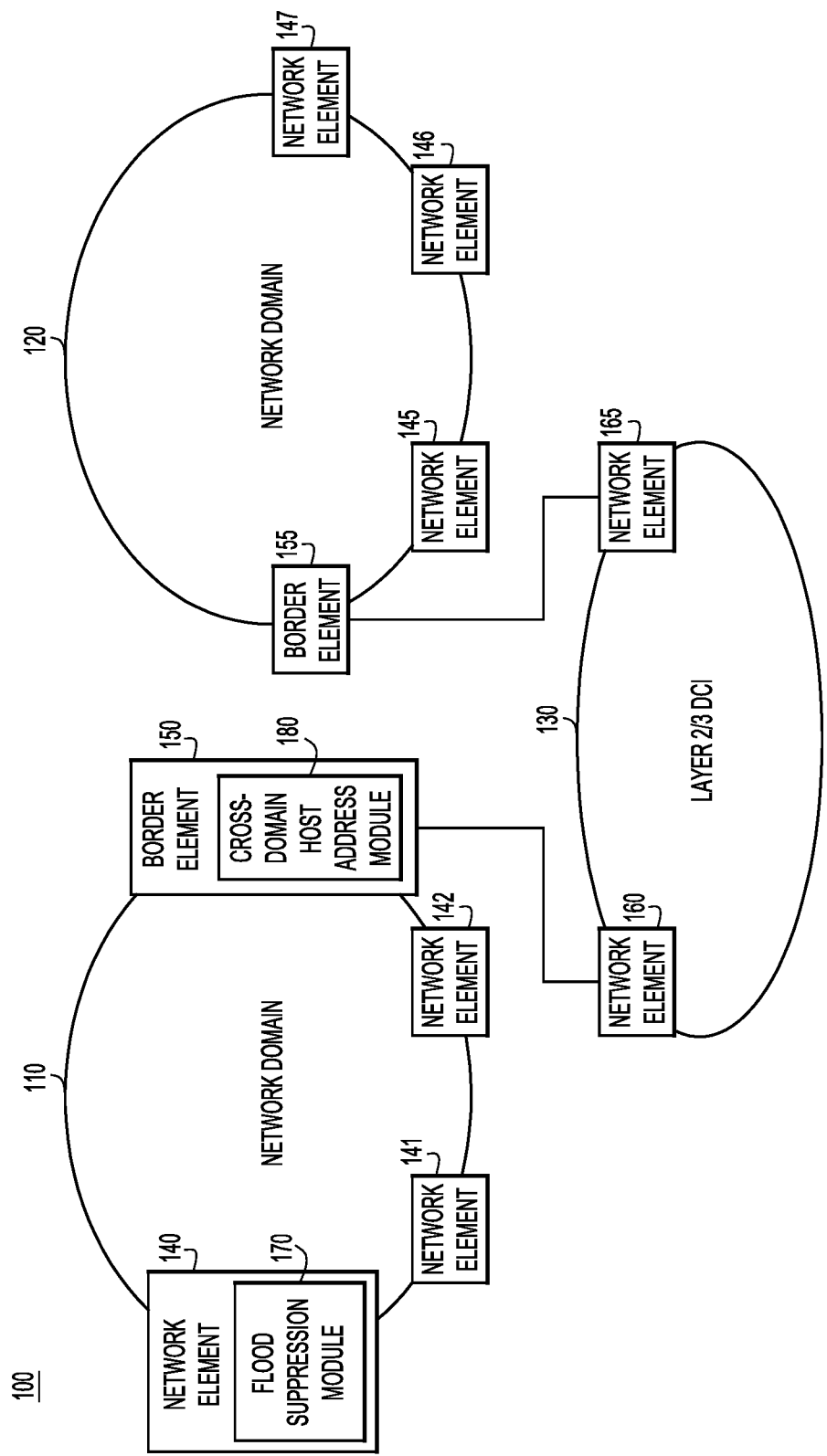
FIG. 1 is a block diagram of a network environment configured to suppress network traffic flooding in single domain and cross-domain networks, according to an example embodiment.

Referring now to FIG. 1, shown is a simplified block diagram illustrating a multi-domain network 100. The multi-domain network 100 includes a first network domain 110 and a second network domain 120 connected via a Layer 2/3 DCI 130. The network domain 110 includes network elements (e.g., switches, routers, virtual machines, etc.) 140, 141, and 142. The network domain 120 includes network elements 145, 146, and 147. The network domains 110 and 120 also includes border network elements (e.g., routers) 150 and 155, respectively, which are used to communicate with the DCI 130. The DCI 130 includes a network element 160 connected to the border network element 150 in the network domain 110. The DCI 130 also include a network element 165 connected to the border network element 155 in the network domain 120.

The network element 140 includes a flood suppression module 170 to suppress unnecessary network traffic within the network domain 110. Although not shown in FIG. 1, the other network elements 141, 142, 145, 146, and 147 may also include analogous flood suppression modules to perform the methods described herein. Additionally, the border network elements 150 and 155 may each include a flood suppression module. The border network element 150 also includes a cross-domain host address module 180 configured to communicate across the DCI 130 to a corresponding cross-domain host address module in the border network element 155. While the cross-domain host address modules are only shown on the border network elements, any of the network elements in either of the network domains may include a cross-domain host address module, which may be inactive if the network element is not an active border network element.

In one example, the network domains 110 and 120 are EVPN domains and the DCI 130 includes both a Layer 3 routing protocol to provide for an IP route exchange, and a Layer 2 data plane for a MAC reachability exchange. A subnet (e.g., 10.1.1.0/24) may be stretched across both network domains 110 and 120, with some or all of the network elements in each network domain instantiating the subnet for hosts that are attached to each network element.

The specific number of network domains, network elements with each network domain, and border network elements shown in FIG. 1 is one example of a multi-domain network 100. The techniques described herein may be applied to other networks that include other numbers of elements than shown in FIG. 1.

A software defined network can provide a network fabric that offers a standards-based control/data plane solution for building massive scale data centers. The spine-leaf based Clos topology offers deterministic latency for any-to-any traffic within the fabric with efficient multi-pathing. The fabric may achieve optimal Layer 2 and Layer 3 forwarding via distribution of end host reachability information over the control plane, which enables a distributed anycast gateway at the leaf/access layer.

In a typical VLXAN BGP EVPN fabric based on a spine-leaf network, a distributed IP anycast gateway implementation at the access layer ensures optimal Layer 2 and Layer 3 forwarding within the fabric. The default gateway for a host is anchored at the directly attached leaf network element. Due to the distribution of route-type entries (i.e., IP-MAC bindings) within the VXLAN EVPN fabric, the directly attached leaf network elements may terminate ARP requests for communication between hosts in the same subnet within the fabric. Additional communication between the fabric domains enable ARP/ND suppression or early ARP termination across multiple VXLAN EVPN fabric domains, as described herein.

Figure 2:
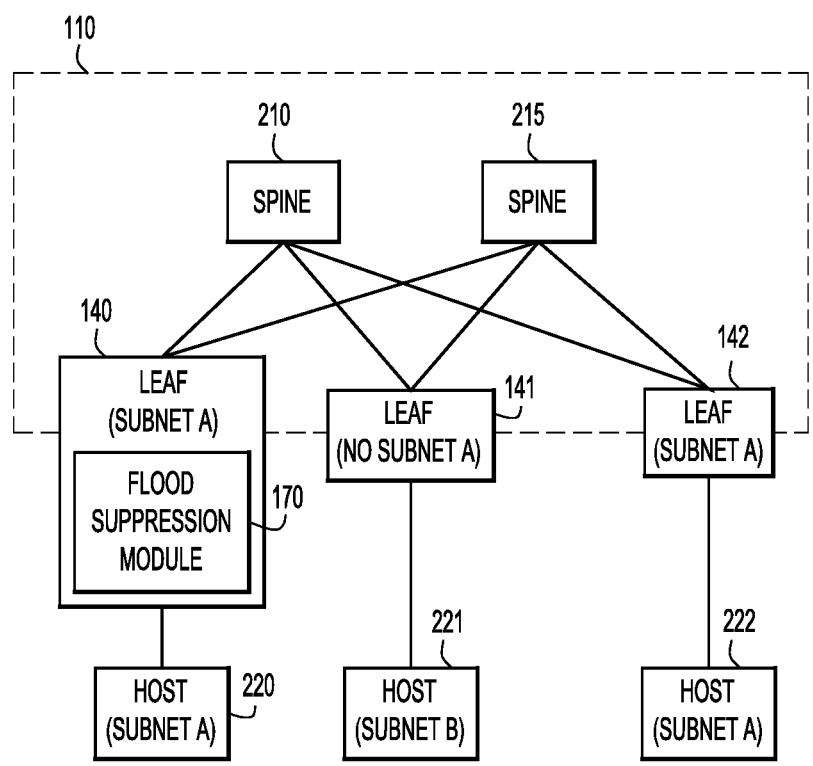
FIG. 2 is a block diagram of a single domain network environment configured to suppress flooding when discovering destination host addresses, according to an example embodiment.

Referring now to FIG. 2, shown is a simplified block diagram illustrating a Clos network topology for the network domain 110. The network elements 140, 141, and 142 are leaf nodes in the Clos topology and network elements 210 and 215 are spine nodes. Hosts 220, 221, and 222 are attached to the leaf nodes 140, 141, and 142, respectively. Hosts 220 and 222 communicate over a particular subnet A (e.g., 10.1.1.0/24), which leads to the subnet A being installed in the attached leaf nodes 140 and 142. For example, host 220 may be assigned an IP address of 10.1.1.1, and host 222 may be assigned an IP address of 10.1.1.2. In contrast, host 221 communicates on a different subnet B (e.g., 10.1.2.0/24), and is assigned a network address (e.g., an IP address of 10.1.2.1) on the different subnet. The network domain 110 may be any type of fabric that uses BGP as a control plane, such as a VXLAN EVPN fabric, or a DFA-BGP L3VPN fabric, to advertise host reachability within the network domain 110.

In one example, the flood suppression logic 170 causes the control plane of the network domain 110 to employ an extension to BGP via special extended communities to prevent flooding of ARP/ND requests throughout the network domain 110. All ARP/ND messages received at a leaf node (e.g., leaf node 140) on the server-facing ports are completely redirected to the software supervisory layer (SUP) of the control plane, rather than being copied to the SUP and forwarded to the hardware for the specified subnet. This is typically achieved through Access Control Lists (ACLs). To enable this behavior, a new forwarding mode may be introduced for the Layer 3 Integrated Route and Bridge Interfaces, i.e., Switched Virtual Interfaces (SVIs). If the destination host address is stored in the BGP control plane, then the leaf node will send an ARP proxy response on behalf of the destination host.

In another example, there is a need for host 220 to communicate with host 222 on the same subnet A. However, host 222 has not yet been discovered on the network fabric 110. When the leaf node 140 receives an ARP/ND request for the host 222 that has not been discovered yet, i.e., the leaf node 140 has not stored a remote BGP route), then the leaf node 140 generates an artificial BGP route for the destination host 222. The artificial BGP route has a special cost community value (e.g., DO-ARP-SERVER-FACING-PORTS), but does not include a valid host route to reach the host 222. Additionally, a timer may be started with a user configurable timeout value, e.g., 60 seconds, to ensure that the artificial route is a temporary route. This temporary route (i.e., the artificial BGP route) is redistributed over BGP from the leaf node 140 to the other leaf nodes 141 and 142 as a host route for the host 222.

All of the other leaf nodes 141 and 142 receive this artificial BGP route with the special extended community (DO-ARP-SERVER-FACING-PORTS). Any leaf nodes that do not have the subnet A instantiated (e.g., leaf node 141) ignore the artificial BGP route, because the host 222 on subnet A cannot be attached to a leaf node 141 that does not handle that subnet. The leaf node 142, which does have the subnet A instantiated, receives the artificial BGP route and determines that some source host attached to leaf node 140 is trying to reach a destination host 222, which has not been discovered. Consequently, the leaf node 142 will perform a local discovery process for the host 222 over only the server-facing ports of the leaf node 142. The local discovery process may be performed as an ARP refresh in which three attempts are made to determine whether the host 222 is reachable locally.

The host 222 responds to the local discovery process from the leaf node 142, e.g., with an ARP response. Since the ARP response is initiated with the anycast-gateway-MAC, which is shared by all of the leaf nodes that implement a distributed IP anycast gateway, the leaf node 142 traps the ARP response from the host 222. In addition, since the leaf node 142 already has a BGP route for the host 222, i.e., the artificial BGP route, host mobility logic handles the update of the host route. The leaf node 142 advertises the actual host route to host 222 with a higher sequence number, thereby informing the other leaf nodes 140 and 141 of the actual host route in a BGP update (i.e., replacing the artificial BGP route).

After receiving the actual BGP route from the leaf node 142, any other leaf nodes (not shown in FIG. 2) that were performing local discovery processes for host 222 terminate/stop their respective local discovery processes. The leaf node 140 that originally created the artificial BGP route receives the updated BGP route with a higher sequence number and withdraws the artificial BGP route. If the leaf node 140 does not receive an updated BGP route for the host 222 within a predetermined amount of time, e.g., the host 222 is dead or not responding, then the leaf node 140 will withdraw the artificial BGP host route. The other leaf nodes 141 and 142 will detect the withdrawal of the artificial BGP route and terminate any local discovery process for the host 222.

In another example, any additional ARP/ND requests for host 222 that are received by any leaf node will be dropped while the artificial BGP route is active. The artificial BGP route with the special community signals the leaf nodes that the host discovery process in already in progress, and any additional requests would be redundant. Using a notification within the BGP control plane enables the discovery of destination hosts without requiring any sort of flooding within the fabric.

In a further example, if the timer on the leaf node 140 expires, then the next ARP/ND request for the host 222 may restart the process and generate a new artificial BGP route. Some dampening may be introduced to prevent re-discovery of the host 222 for a predetermined time period after a failed discovery phase. Appropriate system logs and notifications may be sent to inform the network administrator of multiple consecutive discovery failures for the same destination host 222. If the non-responsiveness of the destination host 222 is a transient condition, then the discovery process will continue automatically.

By leveraging the control plane, once an ARP/ND request has been initiated for a particular destination host, any subsequent ARP/ND requests are suppressed within the leaf node. The suppression of the ARP/ND requests at the initial leaf node avoids the burst of ARP/ND flooding in the fabric when the destination host is not immediately discovered (e.g., dead host, unresponsive host, rogue host, etc.). The techniques presented herein remove all ARP/ND flooding from a VXLAN EVPN data center fabric. Additionally, for fabrics that do not store the MAC-IP bindings of remote hosts, the techniques presented herein replace ARP/ND floods with targeted ARP/ND requests to the destination host after the destination host is discovered. Further, only leaf nodes with the relevant subnets perform the local discovery process.

Figure 3:
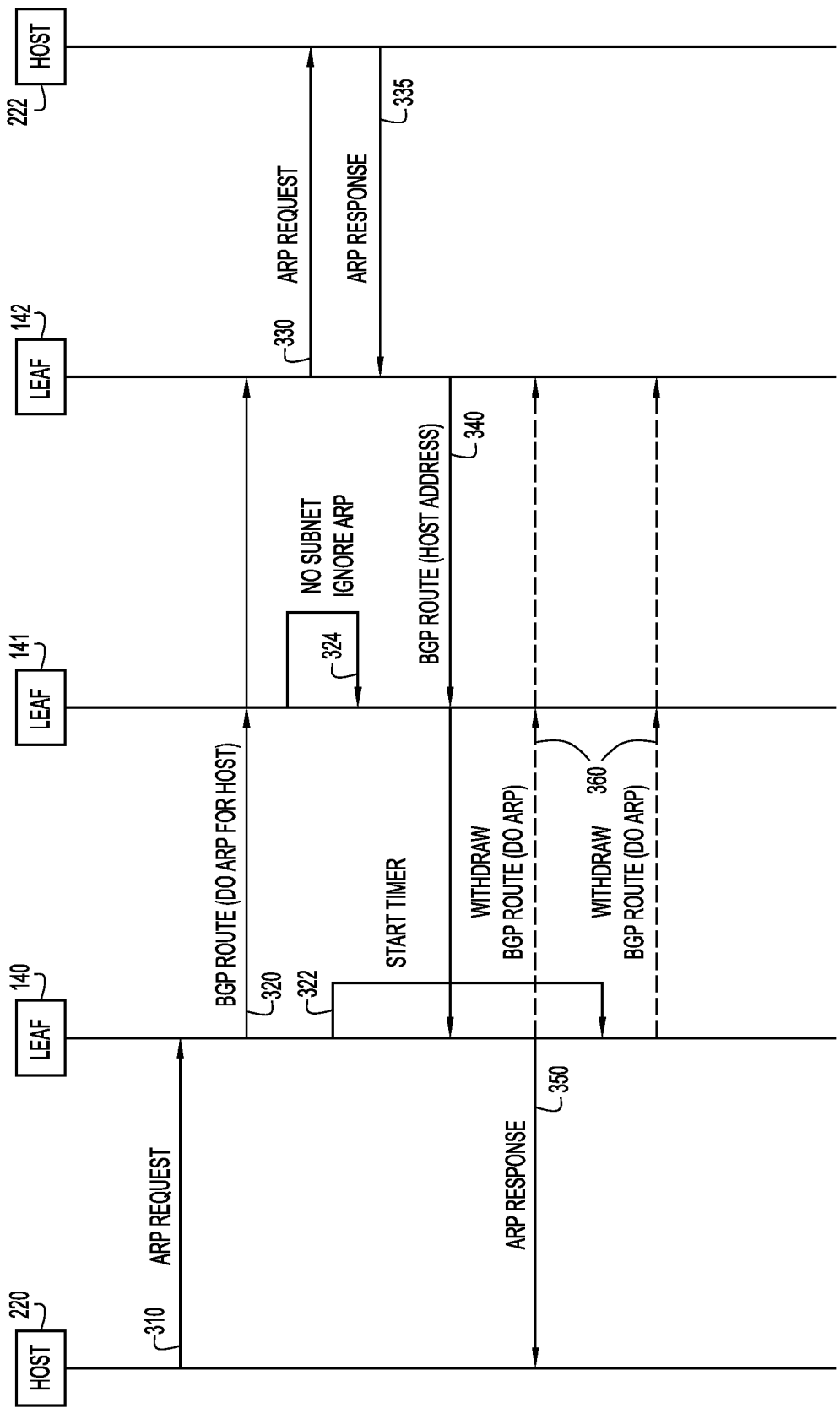
FIG. 3 is a ladder diagram illustrating messages passed across the network environment of FIG. 2 during suppression of an ARP flood, according to an example embodiment.

Referring now to FIG. 3, a ladder diagram illustrates messages passed between a source host 220, destination host 222, and the leaf nodes 140, 141, and 142 of the network domain 110. Initially, the source host 220 sends an ARP request 310 for the destination host 222 to the leaf node 140 to which the source host 220 is directly attached. The leaf node 140 suppresses the ARP request 310 and generates the artificial BGP host route for the destination host 220 with an indication to perform a local ARP process at each leaf node. The leaf node 140 also starts a timer 322 to ensure that the artificial BGP route is withdrawn if the destination host 222 is not found. The leaf node 140 sends the artificial BGP route to the other leaf nodes 141 and 142 via one or more spine nodes (not shown in FIG. 3) in the BGP control plane. The leaf node 141 receives the artificial BGP host route 320, and determines that the subnet of the destination host 222 is not instantiated on the leaf node 141. Since the subnet is not instantiated on the leaf node 141, the leaf node 141 ignores the ARP request at 324.

The leaf node 142 receives the artificial BGP route 320, determines that the relevant subnet is instantiated on the leaf node 142, and performs the local ARP process by sending an ARP request 330 to any attached host, including the destination host 222. In one example, the ARP request 330 includes a header with <Source IP=Anycast-IP, Source MAC=Anycast-gateway-MAC, Destination IP=IP address of host 222, Destination MAC=Broadcast MAC (FF's)>. The destination host 222 responds with an ARP response 335 to the leaf node 142. The leaf node 142 suppresses the ARP response 335 and generates an updated BGP host route 340 with the network address of the host 222. The leaf node 142 distributes the updated BGP route 340 to the other leaf nodes 140 and 141 in the BGP control plane. When the leaf node 140 receives the updated BGP route 340, it generates an ARP response 350 with the network address of the destination host 222. The leaf node 140 completes the ARP discovery by sending the ARP response 350 to the source host 220, which can now directly address the destination host 222.

Once the leaf node 140 receives the updated BGP route 340, it sends a withdrawal 360 of the artificial BGP route through the BGP control plane to the other leaf nodes 141 and 142. Alternatively, the leaf node 140 may send the withdrawal 360 of the artificial BGP route after the timer 322 expires, indicating that the destination host 222 was not found.

In one example, a host mobility manager of the network domain 110 may listen for artificial BGP remote host routes, i.e., BGP routes with (DO-ARP-SERVER-FACING-PORTS) and trigger ARP/ND refresh for the remote host route at regular intervals. The timing of the interval may be configurable until the artificial BGP route is no longer the best path (i.e., the host 222 is discovered and the leaf node 142 generates a new BGP route) or until the artificial BGP route is withdrawn (i.e., the timer 322 expires).

During this period any ARP/ND requests for the host 222 coming from any leaf node will be suppressed since the artificial BGP route exists. All of the leaf nodes with the relevant subnet instantiated interpret the artificial BGP route to mean that an ARP/ND refresh is being done locally to find the host 222. Hence, new requests to find the host 222 will be suppressed with the respective leaf nodes, avoiding subsequent ARP/ND floods/bursts within the network domain 110.

In another example, the artificial BGP route 320 will only be installed in the supervisory software layer on the leaf nodes, and will be installed in the hardware Forwarding Information Base (FIB) as a DROP entry. All of the leaf nodes install the DROP entry in their respective FIBs to allow any traffic directed to host 222, which has not been discovered yet, to be dropped at the first leaf node the traffic hits, rather than being routed to the source of the artificial BGP route (i.e., leaf node 140), where it would be dropped.

In a further example, two implementations are provided for handling the ARP response 350 that notifies any source host (e.g., host 220) that sent an ARP request (e.g., ARP request 310) of the address (e.g., the MAC address) of the destination host 222. In the first implementation, the leaf nodes drop ARP/ND requests until the destination host is discovered. Once the destination host is discovered, any ARP/ND requests will be resolved by the leaf node attached to the source host. If the leaf node has stored the MAC-IP binding for the destination host (e.g., a VXLAN EVPN fabric), then the leaf node will directly respond to the source host with the MAC address of the destination host. Alternatively, if the leaf node does not store the MAC-IP binding (e.g., DFA, IP fabric), then the leaf node generates a targeted ARP/ND request to the destination host on behalf of the source host that sent the original ARP/ND request. This will reach the destination host, which will respond directly to the source host with the MAC address of the destination host, enabling the source host to update the address cache with the MAC address of the destination host.

In the second implementation, the ARP/ND requests are not dropped, as they are in the first implementation. If the leaf nodes store the MAC-IP binding for the destination host (e.g., in a VXLAN EVPN fabric), then the leaf node sends a broadcast ARP/ND response with the MAC address of the destination host. In this way, all of the hosts attached to the leaf node are able to update their host address cache with the MAC address of the destination host. If the leaf node does not store the IP-MAC binding for remote hosts (e.g., DFA, IP fabric), then the host mobility manager tracks any source hosts that send an ARP/ND request for the destination host during the time period that the artificial BGP route is causing the leaf nodes to locally discover the destination host. Once the destination host is found, the host mobility manager directs each respective leaf node to send targeted ARP/ND requests to the destination host on behalf of each of the source hosts that had sent an ARP/ND request. The source hosts will receive the ARP/ND responses from the destination host and cache the MAC address of the destination host.

In still another example, a source leaf node receives an ARP request for a destination host, but the source leaf node has not stored the MAC-IP binding for the destination host and cannot send a proxy ARP response. Instead, the source leaf node suppresses the ARP request and injects an artificial/special route with a special cost community, or other type of external community, into the BGP control plane, which is advertised to all of the leaf nodes in the domain. Though all of the leaf nodes may receive the artificial/special BGP route, only the leaf nodes that have instantiated the subnet of the destination host will perform a host discovery refresh on the server facing ports locally to discover the destination host. If the destination host is discovered, then the MAC-IP binding will be advertised by a MAC-IP BGP route that replaces the artificial/special route.

Any subsequent ARP request for the destination host will be suppressed on all of the leaf nodes, as the presence of the artificial/special route indicates that local discovery processes are already in progress to discover the destination host. Essentially, the BGP update is sent only once using the control plane thereby avoiding continuous data plane flooding in the fabric, and optimizing the performance of the fabric. All of the leaf nodes that receive the artificial/special route will install the route in their respective FIB with a DROP entry so that any routed traffic to the destination host is dropped at the closest leaf node until the destination host is discovered. Dropping additional ARP requests during the host discovery process plays a significant role in cases in which a host is dead or a rogue host performs a subnet scanning attack, thereby keeping the data center fabric secure from such attacks.

While the embodiment described in FIGS. 2 and 3 cover intra-subnet usage, the techniques may also be implemented to cover routing, or inter-subnet, use cases in which a source host seeks a destination host within a different subnet (i.e., Layer 3 routing case). The destination host may be undiscovered, silent, dead, or temporarily down. Typically, the source host (e.g., host 220) resolves the default gateway, which is its directly attached leaf node (e.g., leaf node 140), and start sending data traffic toward the destination host. This traffic will hit the subnet GLEAN entry, which would typically trigger an ARP flood across the fabric to discover the host. However, using techniques similar to the bridging techniques described with respect to FIGS. 2 and 3, instead of flooding the ARP request, the leaf node will insert a special host route for the destination host into the BGP control plane with a special extended community (DO-ARP-SERVER-FACING-PORTS). The same process described with respect to FIGS. 2 and 3 may then be followed to enable the source host to discover the address of the destination host and route the traffic to the destination host.

Even when individual network domains include ARP/ND suppression, broadcast ARP/ND requests from a host in one domain to a host in another domain in the same subnet would typically be flooded across the DCI link. Typically, tenant subnets, i.e., SVIs, are instantiated on network elements that are attached to end hosts. However, border network elements that are usually only attached to a DCI link may not implement the subnet SVIs, since end hosts do not typically connect to the network domain via a border network element.

In other words, ARP/ND suppression is typically constrained to a single EVPN domain. If subnets are stretched across multiple domains, then each domain floods the ARP/ND messages even though ARP/ND suppression may be enabled on both domains. This flooding behavior is due to the MAC-IP bindings from one domain not being propagated to other domains. For instance, the L2/L3 DCI 130 may be a Layer 3 VPN, which does not include the capability to carry EVPN attributes across multiple domains.

In one embodiment described herein, tenant subnets, i.e., SVIs, are instantiated on the border network elements for subnets that are stretched across multiple network domains, e.g., VXLAN EVPN domains. The border network elements handle any ARP/ND requests that they receive via the DCI. Additionally, host discovery on one domain propagates MAC-IP bindings to other network domains if their subnets are stretched across domains. Host removal on one domain also withdraws the MAC-IP bindings that were previously propagated to other network domains. Further, the border network elements update the MAC-IP bindings when a host moves from one domain to another domain. Essentially, the border network elements propagate/update the latest host MAC-IP bindings discovered on one domain to other domains, thereby suppressing/proxying ARP/ND requests across multiple network domains.

In another example, multiple domains propagate MAC-IP bindings from one domain to another domain synchronously and optimally, thereby leveraging ARP/ND suppression features across multiple domains. To propagate the MAC-IP bindings across multiple domains, the border network elements instantiate SVIs with a configuration to identify ports on the border network elements connecting to Layer 2 DCI ports. This configuration enables the border network element to act as a proxy in generating MAC-IP routes through data plane learning for hosts on other domains. The border network elements dynamically determine if/when a subnet is stretched across multiple domains by detecting the availability of a type-5 subnet route from other domains. This ensures that the border network elements only propagate MAC-IP bindings if the respective subnet has been stretched.

For hosts from one domain to reach hosts on another domain, the respective border network elements act as a proxy for the hosts on the other domains. The border network elements are triggered/kicked to ensure that the MAC-IP bindings are synchronized with the other domains. The trigger may be a preemptive trigger such that as soon as a new MAC-IP binding is learned in one domain (e.g., a new host is discovered), then the border network elements of that domain sends a trigger (e.g., a GARP on behalf of the host) to the border network elements of the other domains. The other domains learn the new MAC-IP binding as part of data plane learning through the GARP. The preemptive approach removes any flooding of ARP/ND requests across domains, at the expense of propagating MAC-IP bindings that may never be used for cross-domain traffic.

A non-preemptive approach allows the first ARP for a destination host to be flooded, and the response from the destination host in the other domain acts as the trigger for the border network element to learn the MAC-IP binding of the destination host through data plane learning. In this way, the border network elements only propagate MAC-IP bindings to other domains when there is cross-domain traffic to that destination host.

Additionally, the border network elements acting as a proxy for destination hosts on remote domains should synchronize with the other domains, particularly when a host is removed from a remote domain. The border network element of the local domain also removes the MAC-IP binding for the host on the remote domain. The host type-5 control plane routes from the remote domain validate the data plane-learned MAC-IP routes generated by the border network element on the remote domain.

Further, when a host migrates from an old domain to a new domain, the host is now attached to a network element within the new domain. As such, the border network elements of the new domain should no longer act as proxies for the migrated host. As such, the border network element of the new domain triggers the border network element of the old domain to update the MAC-IP binding of the host. The border network element of the old domain now acts as a proxy to contact the host on the new domain.

Figure 4A:
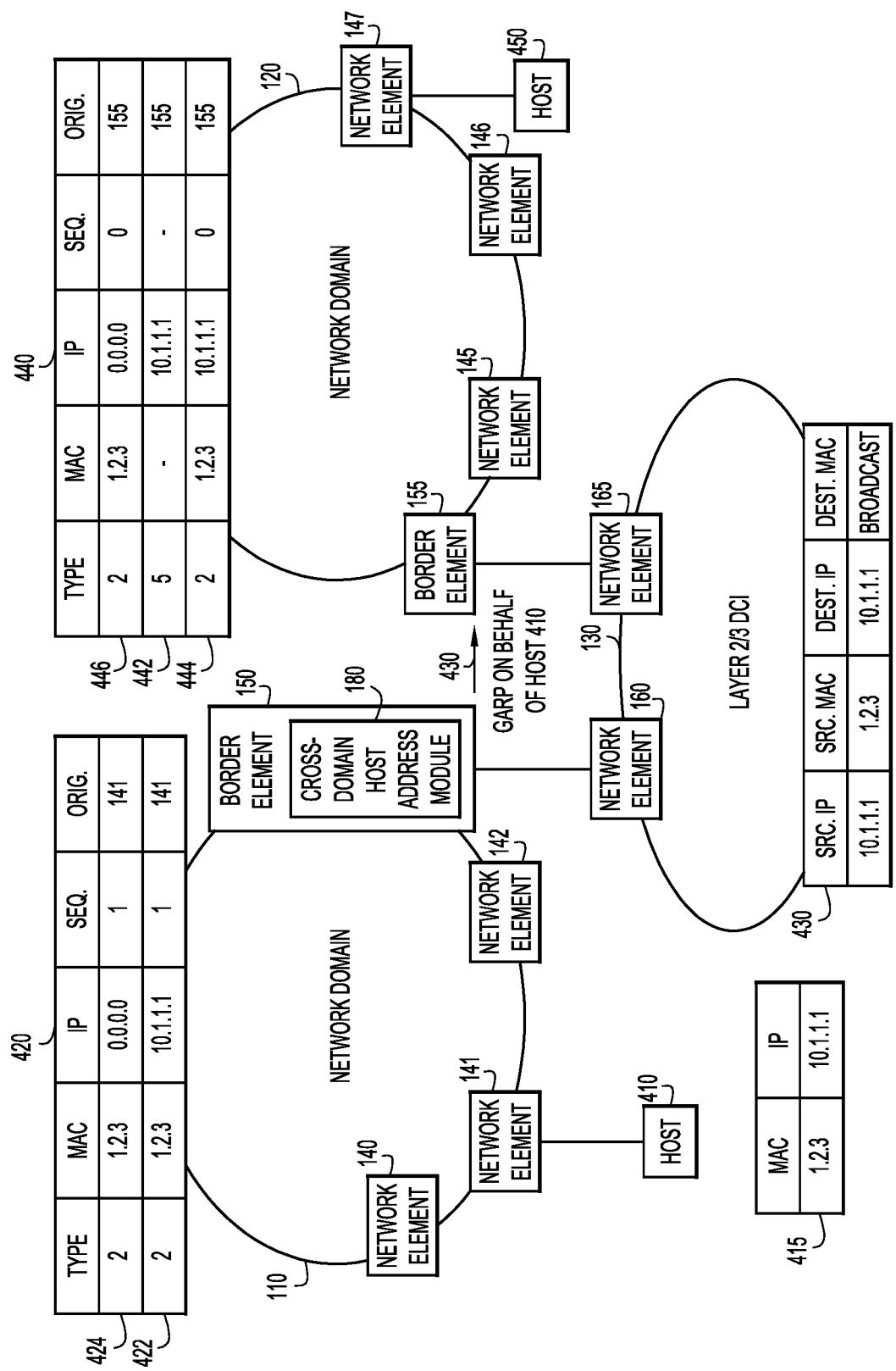
FIG. 4A is a block diagram illustrating the propagation of a destination host address across cross-domain network elements in a stretched subnet, according to an example embodiment.

Referring now to FIG. 4A, a simplified block diagram illustrates the propagation of a host MAC-IP binding across network domains. Host 410 joins the network domain 110 through the network element 141. The host 410 has a MAC-IP binding 415 that associates the MAC address (e.g., 1.2.3) of the host 410 with the IP address (e.g., 10.1.1.1) of the host 410. On joining the network domain 110, the host 410 sends a GARP message to the network element 141. Due to ARP suppression, the network element 141 does not flood the GARP throughout the network domain 110. The network element 141 generates and advertises on the control plane 420, a type-2 EVPN MAC-IP route 422, as well as a type-2 MAC only route 424. The type-2 route 422 and 424 are propagated via the control plane 420 of the network domain 110 to all of the other network elements that have the relevant subnet instantiated.

Since the relevant subnet for the host 410 is stretched into the network domain 120, the border network element 150 has instantiated the subnet, and detects the type-2 route 422 for the host 410. In response to detecting the type-2 route 422, the cross-domain host address module 180 in the border network element 150 sends a GARP message 430 on behalf of the host 410 to the network domain 120 via the DCI 130. The GARP message 430 includes a source IP address of 10.1.1.1, a source MAC address of 1.2.3, a destination IP address of 10.1.1.1, and broadcast destination MAC address (e.g., FFFF.FFFF.FFFF).

The border network element 155 on the network domain 120 receives the GARP 430 and learns the MAC-IP binding 415 for the host 410. Once the control plane 440 of the network domain 120 has received a type-5 host route 442 for the IP address in the MAC-IP binding 415 (i.e., 10.1.1.1), then the border network element 155 determines that control plane 420 on the network domain 110 has converged, and it is safe to advertise/publish the type-2 routes 444 and 446 for the host 410 on the control plane 440. After the type-2 routes 444 and 446 are propagated to the other network elements in the network domain 120 via the control plane 440, then any ARP/ND requests for the host 410 from a host on the network domain 120 (e.g., host 450) can be suppressed/proxied since each network element in the network domain 120 has the MAC-IP binding 415 of the host 410. The validity of the type-2 route 444 is dependent on the type-5 host route 442 being set up from the network domain 110.

While the above description of FIG. 4A relates to a subnet that is already stretched across network domains 110 and 120 before the host 410 is discovered, similar techniques may be applied when the host 410 is discovered before the subnet is stretched. As described above, the network element suppresses the initial GARP from the host 410 and generates and advertises the type-2 routes 422 and 424. However, when the border network element 150 detects the type-2 route 422, the border network element 150 ignores the route because the subnet is not stretched to the network domain 120. When the border network element 150 detects that the relevant subnet has been stretched across to the network domain 120 (e.g., by receiving a type-5 subnet route), the border network element 150 walks through every type-2 EVPN route in the stretched subnet and triggers a GARP message on behalf of the hosts in that subnet to the border network element 155 across the DCI 130. For the host 410, the GARP message 430 includes a source IP address of 10.1.1.1, a source MAC address of 1.2.3, a destination IP address of 10.1.1.1, and broadcast destination MAC address (e.g., FFFF.FFFF.FFFF). The border network element 155 processes the GARP message 130 as in the case in which the subnet was already stretched before the host 410 was discovered, as described above.

In one example, a subnet may be stretched from one domain to another domain at any point in time. For instance, a domain will typically only instantiate a particular subnet when the first host in that subnet is discovered and the subnet is deleted when no hosts are available on the subnet in that domain. The border network elements 150 and 155 detect if a subnet is stretched across multiple domains in order to determine whether to propagate MAC-IP bindings to the other network domains. A border network element may determine that a subnet is stretched when the following criteria are met: (1) the subnet/SVI is instantiated, (2) the Layer 2 DCI port is a member port of the SVI, and (3) a type-5 remote IP subnet route exists from the counterpart border network element in the other network domain.

With SVIs instantiated for the stretched subnet on the border network elements, disaggregated VXLAN EVPN domains are in the broadcast domain for that subnet, i.e., ARP messages would typically be broadcast across both network domains. The cross-domain host address module 180 in the border network element 150 provides special handling for ARP messages received on the Layer 2 DCI port of the border network element 150.

A Layer 2 border element-DCI interconnecting port is identified with a special port configuration on the border element 150. The border element 150 only learns host-specific ARPs (i.e., data plane learning) within the stretched subnet on the DCI port. All other ARP messages on the DCI port will be dropped or ignored. The border network element 155 learns the host ARP/GARP 430 and advertises the type-2 EVPN MAC-IP route 444 within its domain only if the control plane type-5 host route 442 is available from the other domain 110. The border network elements learn host specific ARPs and add them as static entries, i.e., the border elements do not refresh the entries. The ARP entry is valid based on the validity of the control plane type-5 host route 442 from the other domain. This ensures that the control plane 420 of domain 110 synchronizes with the control plane 440 of the domain 120. Additionally, the border network elements will not proxy any ARP requests received on the Layer 2 DCI port, since any relevant MAC-IP bindings will have been propagated to the counterpart border network element, which should proxy any ARP request from its network domain.

Figure 4B:
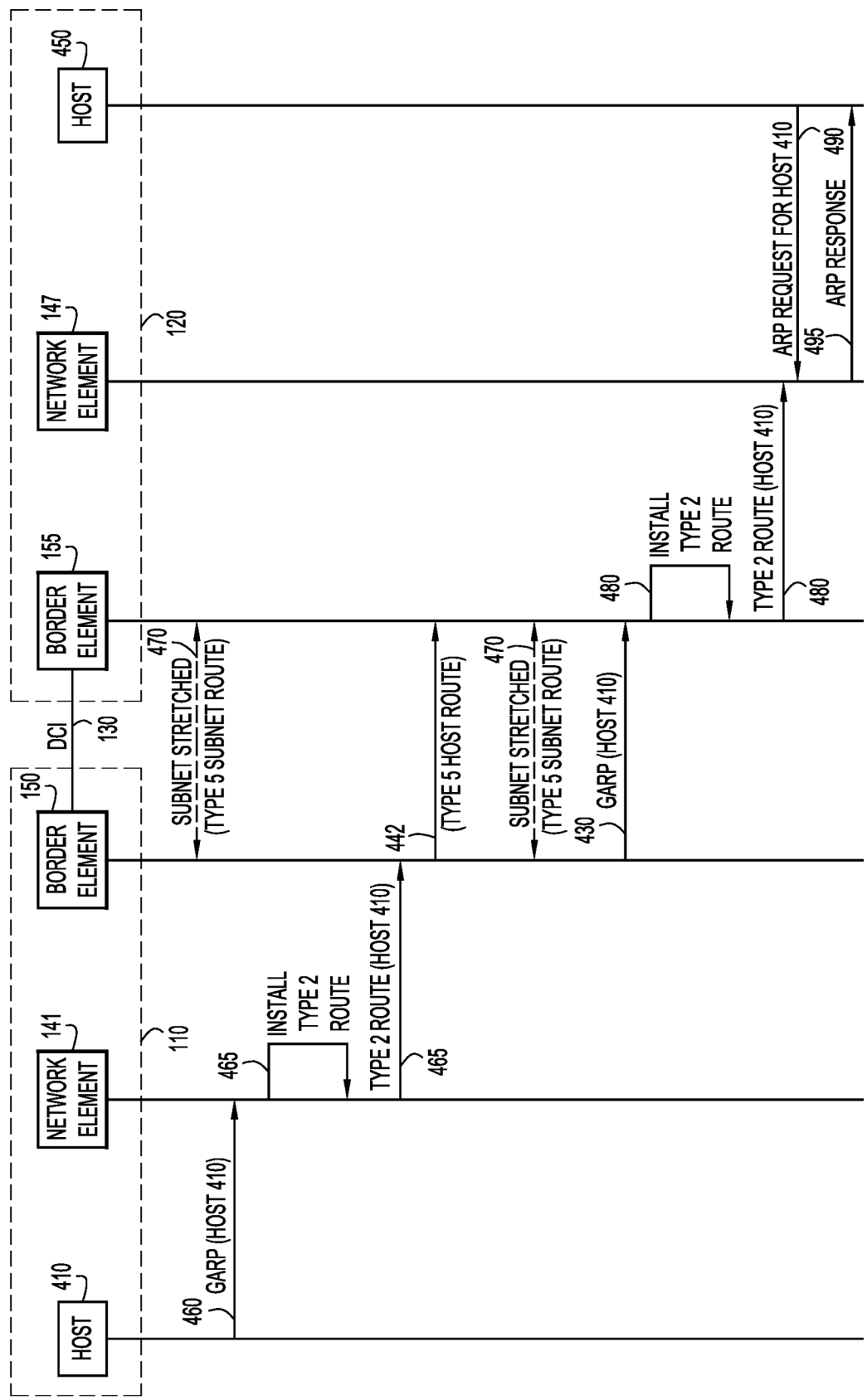
FIG. 4B is a ladder diagram illustrating messages passed across a multi-domain network environment to propagate a host address and suppress additional ARP flooding, according to an example embodiment.

Referring now to FIG. 4B, a ladder diagram illustrates messages passed between hosts and network elements across two network domains to preemptively propagate the MAC-IP binding of a host 410 discovered in domain 110 to the domain 120. When the host 410 joins the network domain 110, it sends an initial GARP message 460 to the network element 141 to which it is attached. The network element 141 suppresses the GARP message 460 and installs the type-2 route 465 in the control plane of the network domain 110. In installing the type-2 route 465 in the control plane the network element 141 sends the type-2 route 465 to the border network element 150. In one example, the type-2 route 465 may include the type-2 EVPN MAC-IP route 422 and the type-2 MAC only route 424 described above with respect to FIG. 4A.

As the subnet of the host 410 is stretched to the network domain 120, the border elements 150 and 155 exchange type-5 subnet routes 470, which provide paths for IP traffic to be routed between the network domain 110 and 120. Additionally, the subnet may be stretched either before or after the host 410 sends the GARP message 460 to the network element 141. Once the border element 150 detects that the subnet is stretched to the network domain 120 (e.g., through the type-5 subnet route 470) and that a type-2 host route 465 has been received for the host 410, the border element 150 sends the GARP message 430 on behalf of the host 410. The GARP message 430 traverses the DCI link 130 between the two network domains 110 and 120.

At some point after the host 410 is discovered on the network domain 110, the border network element 150 installs the type-5 host route 442 on the border network element 155, allowing IP traffic to be routed to the host 410 from any subnet on the network domain 120. The type-5 host route 442 for host 410 may be installed on the border network element 155 before or after the type-5 subnet route 470 is installed, i.e., before or after the subnet is stretched from network domain 110 to network domain 120. After the border network element 155 receives the GARP message 430 and has a type-5 host route 442 installed from the border network element 150, the border network element 155 installs a type-2 route 480 for the host 410 in the control plane of the network domain 120. In installing the type-2 route 480 in the control plane the border network element 155 sends the type-2 route 480 to the network element 147. In one example, the type-2 route 480 may include the type-2 EVPN MAC-IP route 444 and the type-2 MAC only route 446 described above with respect to FIG. 4A.

If the host 450 that is attached to the network element 147 sends a ARP request 490 to determine the address of the host 410, then the network element 147 suppresses the ARP flood and acts as an ARP proxy for the host 410. Since the network element 147 has stored the type-2 route 480, including the MAC-IP binding for the host 410, in the control plane for the network domain 120, the network element responds with the appropriate MAC-IP binding in the ARP response 495.

As described in FIGS. 4A and 4B, the border network element 150 preemptively propagates the MAC-IP bindings for the host 410 across to the network domain 120 as soon as the subnet is stretched and the host 410 is discovered on the network domain 110. When the host 410 is discovered on the network domain 110, i.e., through a GARP/ARP message, a type-2 MAC-IP EVPN BGP route 422 is generated on the control plane 420 of the network domain 110. Due to the ARP suppression in the network domain 110, the GARP/ARP messages are not flooded in the network domain 110. When the border network element 150 receives the type-2 MAC-IP EVPN route 422, the border network element 150 determines whether the relevant subnet is stretched across multiple domains by detecting that the subnet SVI is instantiated, detecting that the DCI port on the border network element 150 is a member of the subnet SVI, and detecting that a type-5 subnet route exists from the network domain 120.

If the subnet is stretched, the border network element 150 generates the GARP request 430 on behalf of the host 410 on the Layer 2 DCI port. When the border network element 155 receives the GARP 430, the border network element 155 learns the host 410 on the DCI port and waits for the arrival of a type-5 IP route 442 from the network domain 110. If the border element 155 receives the type-5 IP route 442 before a timeout timer expires, then the border network element 155 will generate the type-2 MAC-IP route 444 in the control plane 440 of the network domain 120. In this manner, the MAC-IP binding of the host 410 are preemptively propagated from the network domain 110 to the network domain 120.

If the subnet of the host 410 is not initially stretched across to the network domain 120, then the border element 150 ignores any type-2 routes for the host 410 and does not need to propagate the MAC-IP binding to any other domain. If the border element 150 detects that the subnet is stretched at a later time, then the border element 150 walks through each type-2 MAC-IP route in that subnet and generates a GARP on behalf of the hosts belonging to the domain 110 to the other domain 120 on the DCI port. These GARP messages propagate the MAC-IP bindings from the domain 110 to the domain 120. By preemptively propagating the MAC-IP bindings across the domains of a stretched subnet, an ARP request to a host belonging to another domain will be suppressed and proxied by the network elements in the domain originating the ARP request, thereby avoiding ARP floods across multiple network domains.

In a non-preemptive alternative, the border network elements may wait for the first ARP for a host in another domain before propagating the MAC-IP binding of that host. The non-preemptive approach propagates host MAC-IP discovered on one domain across multiple domains only on the first ARP request from one domain to hosts belonging to another domain. In other words, the MAC-IP bindings are only propagated across domain boundaries when cross-domain hosts first begin communicating with each other.

Figure 5:
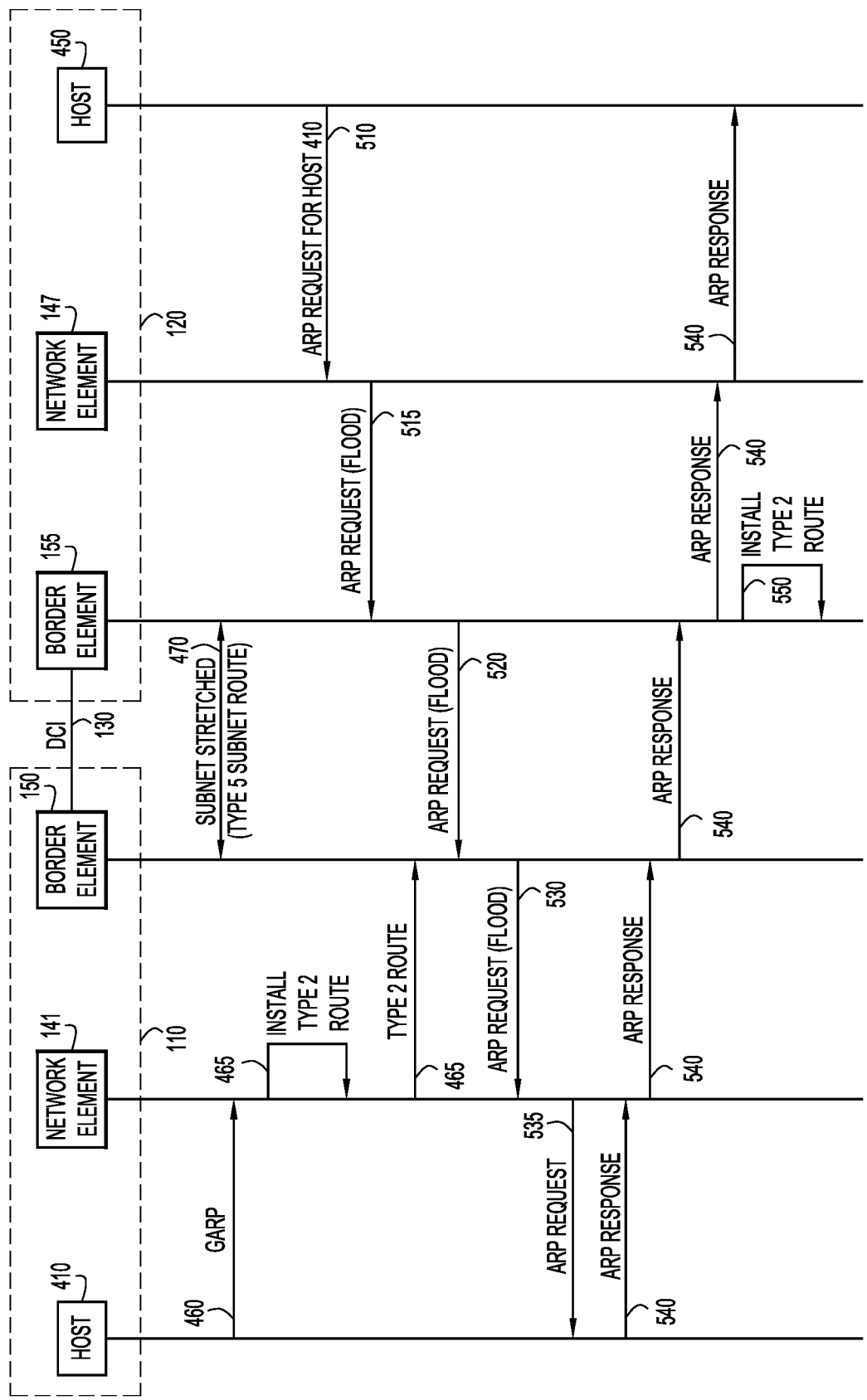
FIG. 5 is a ladder diagram illustrating messages passed across a multi-domain network environment to propagate a host address across a DCI in response to a first ARP request for the host address, according to an example embodiment.

Referring now to FIG. 5, a ladder diagram illustrates a non-preemptive approach to propagating the MAC-IP binding of a host 410 discovered in domain 110 to the domain 120 in response to an ARP request from a host in the domain 120. Initially, the host 410 is discovered on the domain 110 in a similar manner as described in FIG. 4B. The host 410 sends a GARP message 460 to the network element 141, which is suppressed and translated into a type-2 route 465 that is propagated through the control plane of the network domain 110 to the other network elements, including the border network element 150. Unlike, the preemptive approach described with respect to FIGS. 4A and 4B, the border element 150 does not automatically send GARP message on behalf of the host 410, even though the border element 150 has detected that the subnet is stretched and has a type-5 subnet route 470.

When the host 450 on the network domain 120 wants to initiate communication with the host 410 on the network domain 110, the host 450 sends an ARP request 510 for the host 410 to the network element 147 to which the host 450 is attached. Since the MAC-IP binding for the host 410 has not been propagated to any of the network elements of the network domain 120, the network element 147 sends the ARP request 515 to the border network element 155 as part of the ARP flood for an initial ARP request. The border network element 155 sends the ARP request 520 across the DCI 130 to the border element 150 in the domain 110. The border element 150 continues the initial ARP request flood by sending the ARP request 530 to the network element 141. The network element 141 sends the ARP request 535 to the host 410, completing the initial ARP request from the host 450.

In response to the ARP request 535, the host 410 sends a unicast ARP response 540 to the host 450 via the network element 141, the border element 150, the border element 155 and the network element 147. When the border network element 155 receives the ARP response 540, the border network element 155 determines whether a type-5 host route for host 410 has been installed. Once the type-5 host route for the host 410 has been received and installed in the control plane of the network domain 120, the border network element 155 stores the MAC-IP binding of the host 410 by installing a type-2 MAC-IP route 550 in the control plane of the network domain 120. After the first ARP request for the host 410 from any host in the network domain 120, the MAC-IP binding of the host 410 are stored in the control plane of the network domain 120 and any subsequent ARP requests may be suppressed/proxied by the network elements in the network domain 120.

In one example of the non-preemptive approach, when any host is discovered on a domain (e.g., through GARP/ARP messages), a type-2 MAC-IP EVPN BGP route is generated on the control plane of that domain. The GARP/ARP messages may be suppressed in this original domain to prevent ARP flooding. Until a host on another domain sends an ARP request, the other domains do not have the MAC-IP bindings of the newly discovered host. When a host on a second domain initially sends an ARP request for the new host on the first domain, the ARP request will be flooded across the domains. When the new host receives the ARP request from the second domain, the new host responds with a unicast ARP response to the host on the second domain. The border network element of the second domain receives the ARP response and learns the ARP entry for the host on the first domain. For instance, an ARP snooping feature in a VXLAN EVPN with ARP suppression may punt both ARP requests and ARP responses to the SUP, allowing the border gateway element to detect unicast ARP responses and store the MAC-IP binding contained in the ARP response. After the first ARP request/response from the second domain for a host on the first domain, the MAC-IP bindings will be propagated to the second domain allowing the second domain to suppress/proxy any subsequent ARP request for the host in the first domain.

Both the preemptive and the non-preemptive approaches have advantages and disadvantages, which may be weighed for each deployment scenario. For instance, the preemptive approach ideally suppresses all ARP flooding since the MAC-IP bindings are propagated across the domains as soon as possible. Additionally, the preemptive approach identifies duplicate hosts across domains, and allows network elements to handle Reverse ARP (RARP)-based host moves, since the network elements receive the MAC-IP bindings. However, the preemptive approach may result in a sudden rush of GARP traffic across the DCI links, stressing processor resources on the border network elements. For instance, when a subnet is stretched to one or more additional domains after several hosts have been discovered on the original domain, the border network element walks through each type-2 host route and sends a GARP for each host on the DCI port to the additional domains.

In contrast, the non-preemptive approach can handle larger scale deployments and uses less processor resources from the border network elements, since the border elements do not send GARP messages and only propagate the MAC-IP bindings for hosts that are in conversations across domains. However, the non-preemptive approach always floods the initial ARP request, does not identify duplicate hosts across domains, and involves additional coordination between the network elements during a RARP-based host migration. For instance, the new network element does not automatically learn the MAC-IP bindings, and requires the old network element to which the migrated host was previously attached to send a targeted ARP to the host in order for the host to be discovered at the new network element.

Figure 6:
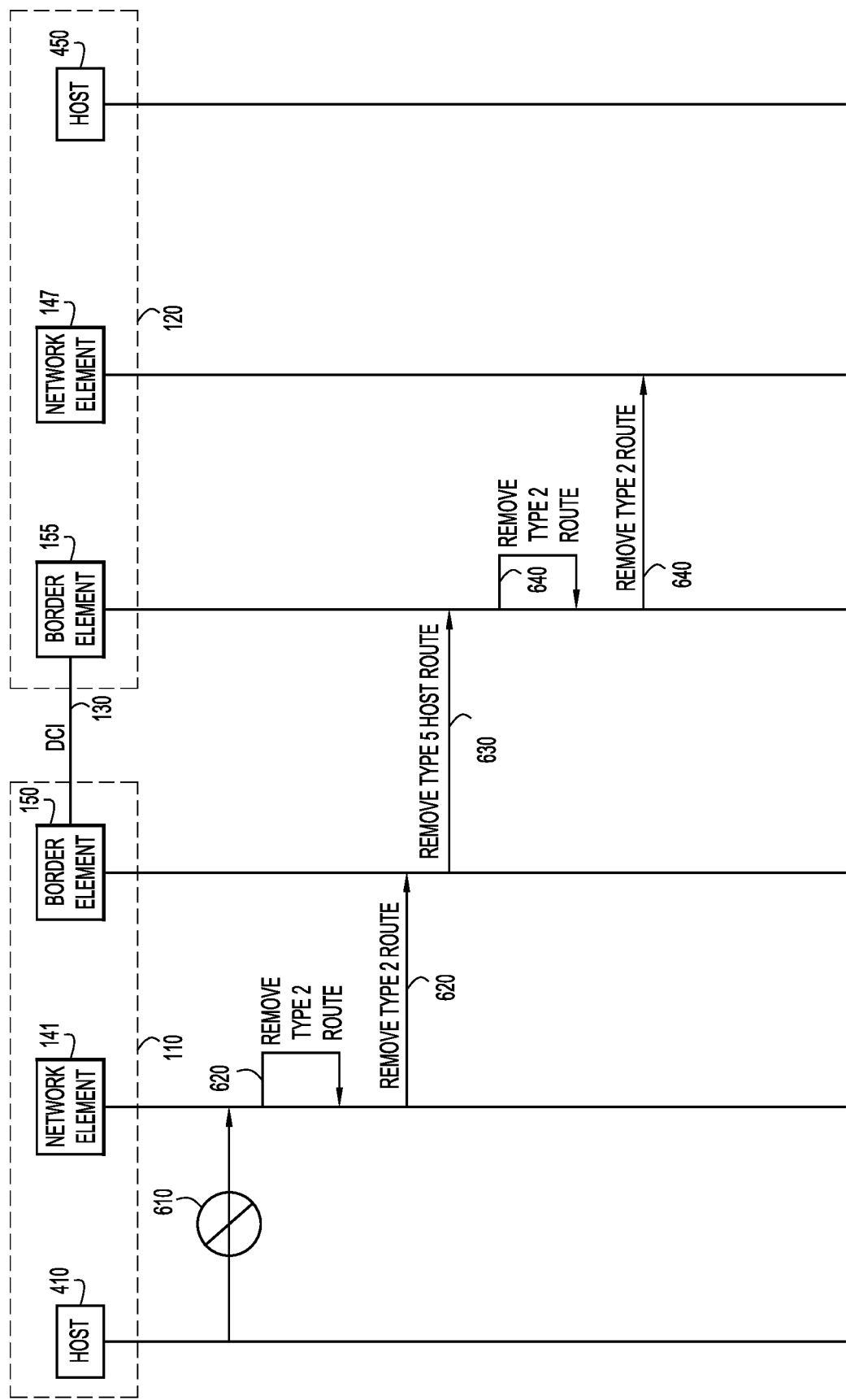
FIG. 6 is a ladder diagram illustrating messages passed across a multi-domain network environment to remove a host address across the multi-domain network when a host is removed from one domain, according to an example embodiment.

Just as the MAC-IP bindings for a newly discovered host on one domain are propagated to a second domain when the subnet is stretched across the domains, host MAC-IP bindings should be removed from the second domain when the host is removed from the first domain. Referring now to FIG. 6, a ladder diagram illustrates messages passed in removing the MAC-IP binding across network domains. Initially, the network element 141 detects that host 410 is no longer attached to the network domain 110. For instance, the host 410 may send an explicit message 610 to the network element 141 indicating that the host 410 is being removed. Alternatively, the network element 141 may detect the absence of a heartbeat signal that is required according to the protocol of the network domain 110.

When the network element 141 detects the removal of the host 410, the network element 141 removes the type-2 host route 620 from the control plane of the network domain 110. The network element 141 may remove both a type-2 MAC-IP EVPN route and a type-2 MAC only route associated with the host 410. The network element 141 propagates the removal of the type-2 route 620 across all of the network elements in the network domain 110, including the border network element 150. In response, the border element 150 withdraws the type-5 host route 630 from the border element 155 across the DCI 130. On detecting the removal of the type-5 host route 630, the border element 155 removes the type-2 MAC-IP route 640 from the control plane of the network domain 120. The border element propagates the removal of the type-2 route 640 to the other network elements in the domain 120, including network element 147. Removing the type-5 host route 630 from the control plane of any remote domain across which the subnet for the host 410 has been stretched ensures that any host route to the host 410 is removed across all of the remote domains as well as the original domain.

In the example shown in FIG. 6, the removal of host 410 from the network domain 110 causes the border element 155 in the network domain 120 to remove the type-5 host route 630, which triggers the removal of the type-2 host route 640. Alternatively, the border element 155 may remove the type-2 host route 640 when the subnet is no longer stretched across the network domains 110 and 120, e.g., when there are no more hosts in the subnet on network domain 120. In this alternative example, on the removal of the type-5 subnet route to the network domain 110, the border router 155 will also remove the type 2 host route 640 for the host 410, as well as any other type-2 host routes for hosts in the network domain 110. In other words, if either the type-5 host route 630 or the type-5 subnet route is removed from the border network element 155, then the border network element 155 removes the type-2 host route 640.

In another example, any migration of a host from one network element to a new network element within the same domain updates the control plane of that domain with the new type-2 routes directing traffic to the new network element. Since the host route entries of the remote domains merely point to the border network element that reaches the appropriate domain, none of the host routes in remote network domains are updated after an intra-domain host migration. However, an inter-domain host migration uses all of the host routes and MAC-IP bindings stored in each of the control planes of the domains to be updated.

Figure 7A:
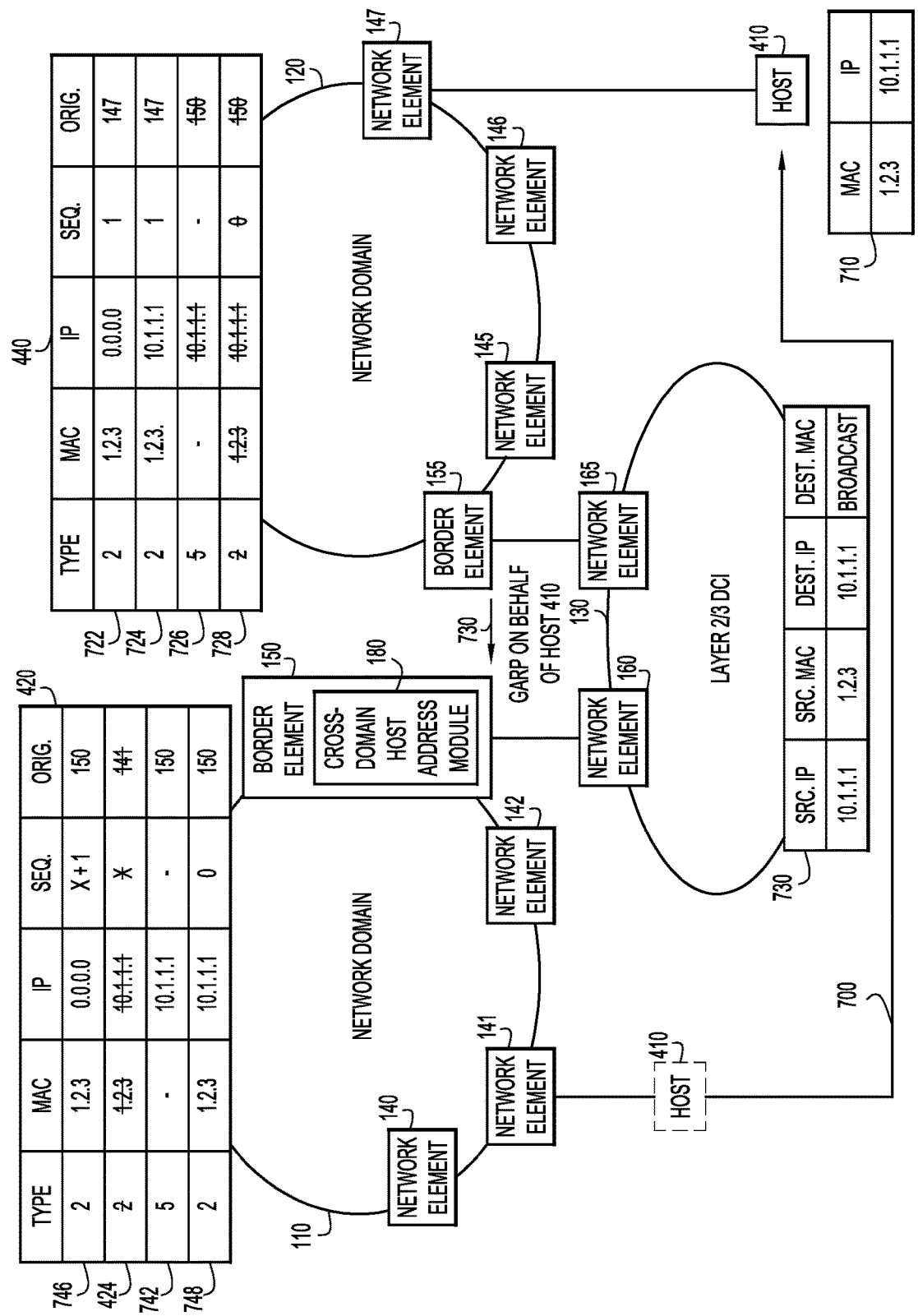
FIG. 7A is a block diagram illustrating the propagation of a destination host address across cross-domain network elements in a stretched subnet when a host migrates from one domain to a new domain, according to an example embodiment.

Referring now to FIG. 7A, a simplified block diagram illustrates the propagation of a host MAC-IP binding across network domains after a host migrates across network domains. The migration 700 of the host 410 from the network domain 110 to the network domain 120 causes all of the stored host routes for the host 410 to become outdated. When the migrated host 410 is started on the new domain 120, it sends a GARP to the network element 147 including the MAC-IP binding 710 for the host 410.

On receiving the GARP from the migrated host 410, the network element 147 installs new, local type-2 routes for the host 410. The new type-2 routes include a type-2 MAC only route 722 and a type-2 MAC-IP EVPN route 724. The host mobility logic of the network ensures that the previous type-5 host route 726 and type-2 MAC-IP route 728 are removed from the control plane 440 of the network domain 120. The local type-2 routes 722 and 724 supersede the previous type-2 route 728 by incrementing the Sequence ID of the routes 722 and 724. To clear the stale MAC-IP binding of the migrated host 410 that remains on the original domain 110, the border network element 155 generates and sends a GARP message 730 on behalf of the migrated host 410.

The border network element 150 on the network domain 110 learns the MAC-IP binding for the migrated host 410, but waits for the type-5 host route 742 to become the best path to reach the host 410. Due to receiving the GARP message 730, the border element 150 detects a MAC move change for the host 410, which triggers a host verification process. Since the host 410 has migrated out of the domain 110, the stale type-2 route 424 is removed from the control plane 420. Once the stale type-2 route 424 has been withdrawn, the type-5 host route 742 becomes the best path to reach the migrated host 410, and the border element 150 advertises the type-2 MAC only route 746 and the type-2 MAC-IP EVPN route 748 that point to the border element 150. Now the MAC-IP bindings for the migrated host 410 have been updated on both of the network domains 120 and 110.

In one example of a GARP/ARP-based notification of a host migration, when a host migrates across network domains, the host sends out a GARP/ARP message from the newly location of the migrated host. On the new domain, the GARP/ARP message may not be flooded due to ARP suppression, but a host mobility process generates a type-2 EVPN route with a better sequence ID than the previous type-2 route. The border network elements on the new domain detect that the new type-2 EVPN route indicating that the migrated host has moved from the DCI port of the border network element (i.e., where the previous type-2 EVPN route was directed) to the new domain. Consequently, the border network element on the new domain removes the ARP information it previously learned from its DCI port, thereby cleaning up the previous type-2 route. With the previous type-2 route removed, the route to the migrated host converges within the new domain.

However, the control plane of the original domain still points to the old location. To resolve the stale control plane entries on the original domain, the border element of the new domain generates a GARP message on behalf of the migrated host and sends it on the DCI port to the border network element of the original domain. This GARP across the DCI allows the border network element on the original domain to detect that the host MAC address has moved to a different domain, and the border element withdraws the local host entry in the control plane of the original domain. Additionally, the border network element on the original domain learns the new MAC-IP binding ARP entry and waits for the type-5 host route for the migrated host to become the best path. Once the stale local host entry is removed from the control plane on the original domain, the type-5 host route will become the best path to reach the host 410. The border network element advertises the suppressed type-2 MAC-IP host route through the control plane of the original domain updating the control plane to accurately reflect the new location of the migrated host.

Figure 7B:
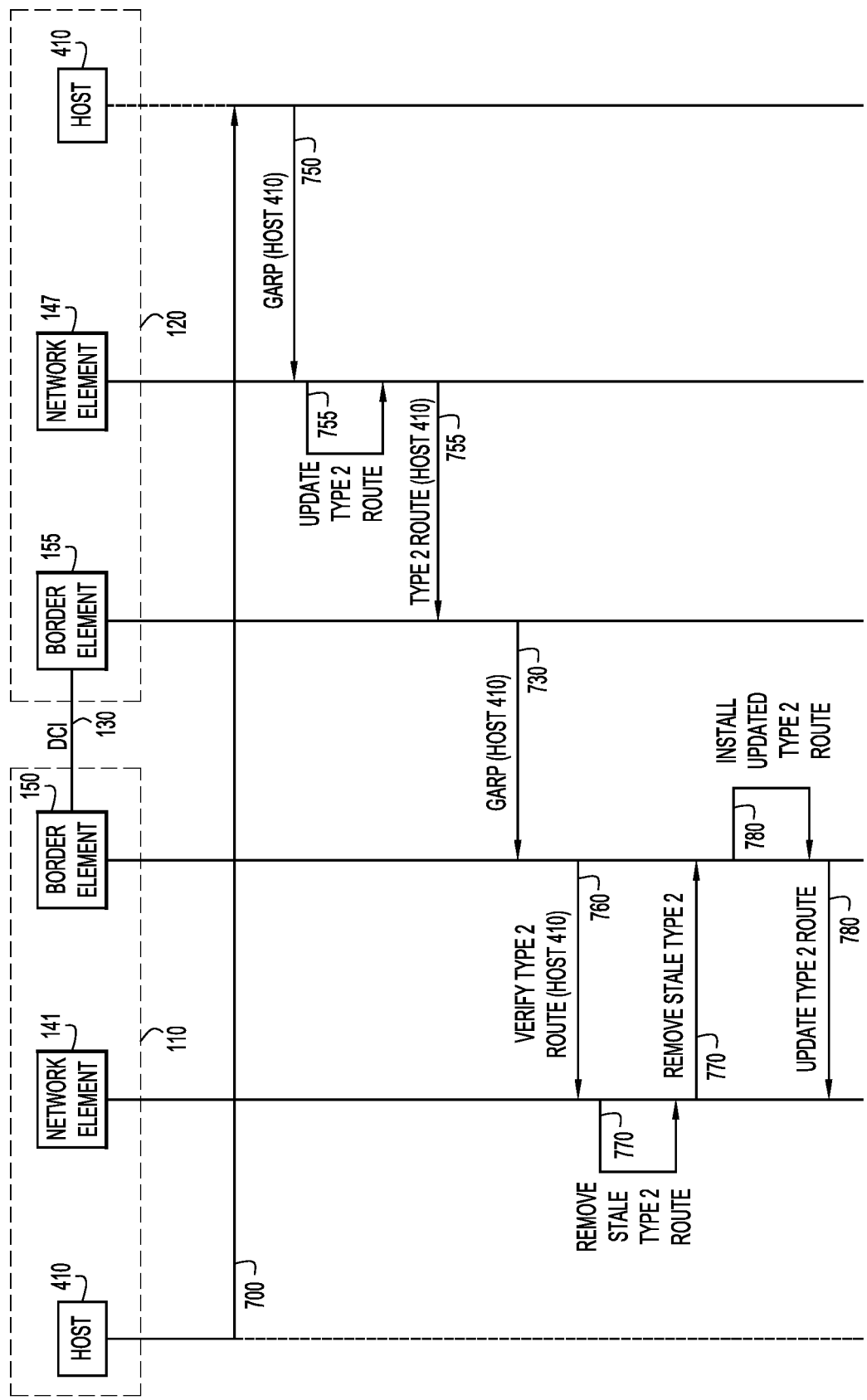
FIG. 7B is a ladder diagram illustrating messages passed across a multi-domain network environment to propagate a host address when a host moves from one domain to a new domain, according to an example embodiment.

Referring now to FIG. 7B, a ladder diagram illustrates messages passed between hosts and network elements across two network domains to update the MAC-IP binding of a host 410 that migrates from the domain 110 to the domain 120. Initially, the migration 700 of the host 410 from the network domain 110 to the network domain 120 triggers a GARP message 750 from the migrated host 410. The network element 147 to which the migrated host 410 is attached receives the GARP message 750 and updates the type-2 route 755 in the control plane of the domain 120. In one example, updating the type-2 route 755 may include removing the previous type-2 route 728 and entering the type-2 EVPN MAC-IP route 724 and the type-2 MAC only route 722 described above with respect to FIG. 7A. The updated type-2 route 755 is propagated through the control plane to the border element 155.

On receiving the updated type-2 route 755, the border element 155 sends the GARP 730 on behalf of the migrated host 410 over the DCI 130 to the border element 150 of the domain 110. The border element 150 sends a message 760 to the network element 141 in an attempt to verify the location of the host 410. On detecting that the host 410 is no longer attached to the network element 141 the stale type-2 route 770 is removed from the control plane of the domain 110. Once the stale type-2 route is removed, and the type-5 host route to the host 410 is the best path, then the border element 150 advertises the updated type-2 route 780 on the control plane of the domain 110. The type-2 route 780 may include the type-2 EVPN MAC-IP route 748 and the type-2 MAC only route 746 described above with respect to FIG. 7A In an alternative to the GARP/ARP-based host migration, a migrated host may send a RARP message from its new location. Due to the RARP message, the control plane of the new network domain obtains a converged MAC entry for the migrated host. If the control plane of the new domain includes a remote MAC-IP binding of the migrated host, a simple ARP request will lead to the discovery of the migrated host. However, if the control plane of the new domain does not include the remote MAC-IP binding of the migrated host, then it requires the original network element in the original network domain to send a targeted ARP to the migrated host for the migrated host to be discovered on the new domain. Once the migrated host is discovered on the new domain, the MAC-IP bindings may be updated according to the same process described above with respect to FIGS. 7A and 7B. Additionally, the removal of the stale entry in the control plane of the original domain may be performed as part of the MAC move change in the original domain due to the RARP being flooded.

Figure 8:
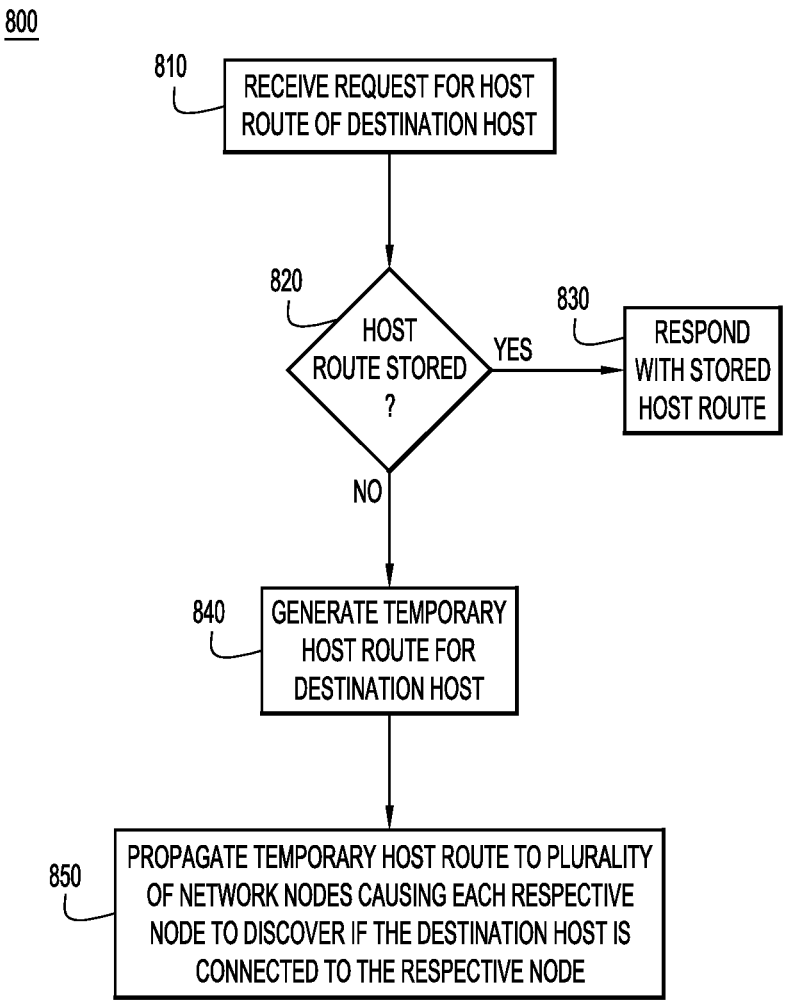
FIG. 8 is a flowchart of a method for suppressing network traffic flooding in a single domain, according to an example embodiment.

Referring now to FIG. 8, a flowchart illustrates a process 800 performed by network element (e.g., a leaf node) in suppressing floods of ARP request in a single network domain. In step 810, the leaf node receives a request from a source host attached to the leaf node. The request identifies a destination host for which the source host uses a host route to communicate. In one example, the request is an ARP request directed to the destination host from the source host. If the leaf node has stored the host route for the destination host, as determined in step 820, then the leaf node responds to the source host with the stored host route for the destination host in step 830.

If the leaf node does not have a host route for the destination host, then the leaf node generates a temporary host route for the destination host. In one example, the leaf node generates an artificial BGP route with the special extended community (DO-ARP-SERVER-FACING-PORTS). In step 850, the leaf node propagates the temporary host route to a plurality of network nodes (e.g., other leaf nodes in the network fabric). The temporary host route causes each respective network node of the plurality of network nodes to discover if the destination host is connected to the respective network node. In one example, the plurality of network nodes receive the BGP route with the special extended community and each respective network node initiates an ARP discovery process for the destination host on the hosts attached to each respective network node. When one of the plurality of network nodes discovers the destination host, the host route to the destination host is propagated back to the leaf node to which the source host is attached.

Figure 9:
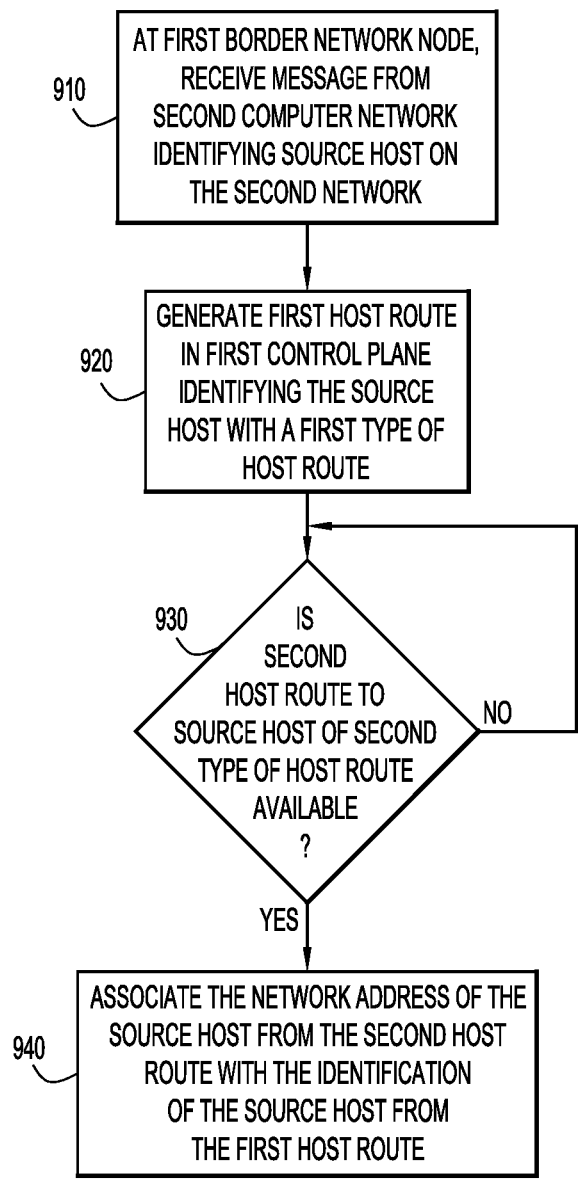
FIG. 9 is a flowchart of a method for propagating host address information across a multi-domain network environment, according to an example embodiment.

Referring now to FIG. 9, a flowchart illustrates a process 900 performed by a border network node in propagating host routes from a first computer network to a second computer network. In step 910, a first border network node on a first computer network receives a message from a second border network node on a second computer network. The message identifies a source host on the second computer network. In one example, the message is a GARP message that includes the MAC address of the source host. In step 920, the first border network node generates a first host route in the first control of the first computer network. The first host route identifies the source host with a first type of host route. In one example the first type of host route is a type-2 route, and the first host route includes the MAC address of the source host.

The first border network node determines whether a second host route to the source host is available on the first control plane in step 930. The second host route is a second type of host route that includes the network address of the source host. In one example, the second type of host route is a type-5 host route, and the second host route include the IP address of the source host. After the first border network node determines that the second host route is in the first control plane, then the first border network node associates the network address of the source host from the second host route with the identification of the source host from the first host route in step 940. In one example, the first border network node associates the IP address of the source host with the MAC address of the source host in a type-2 MAC-IP EVPN host route.

Figure 10:
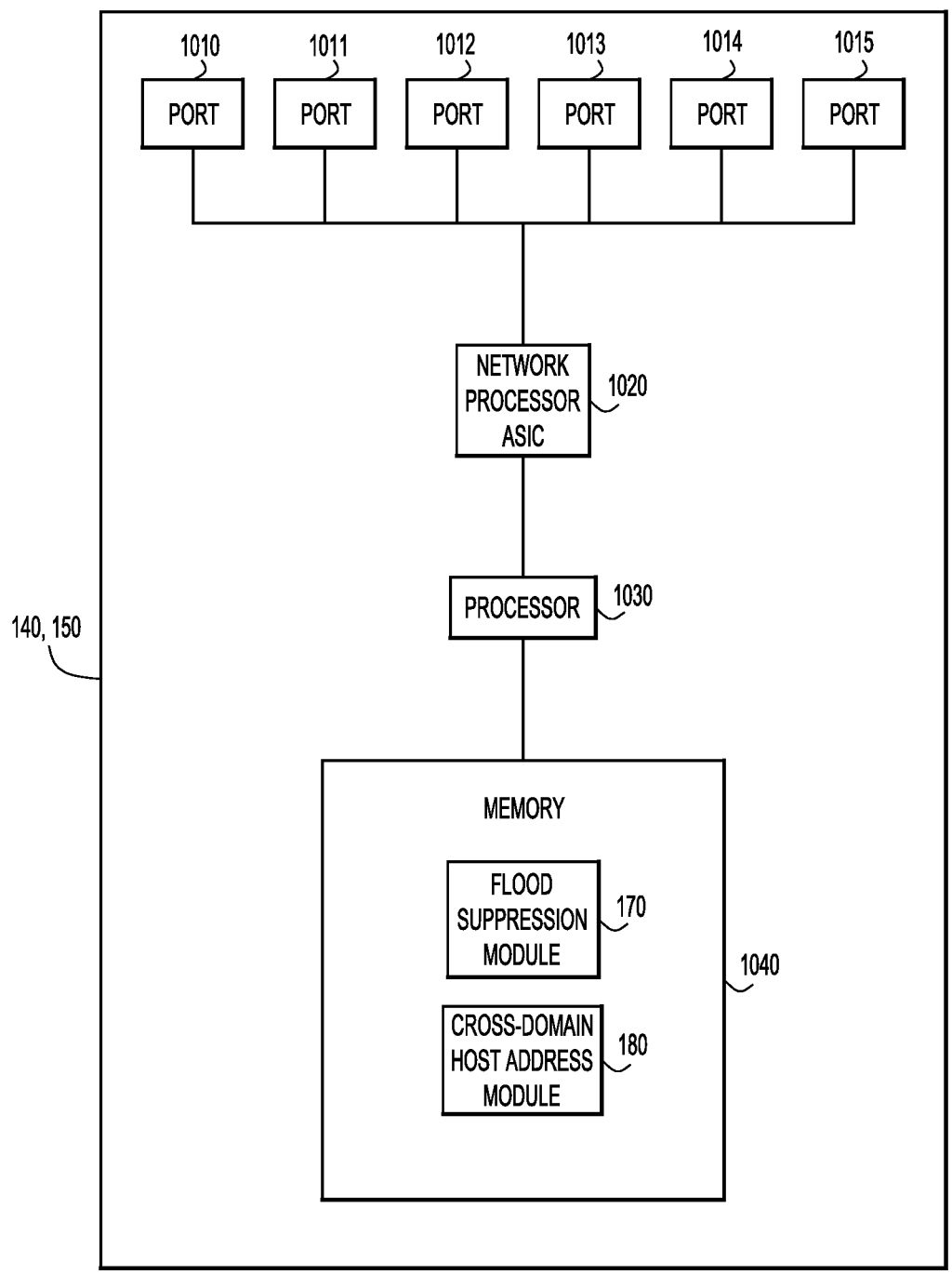
FIG. 10 is a block diagram of a networking device configured to participate in the operations presented herein, according to an example embodiment.

FIG. 10 illustrates a block diagram of a network device, which could be a network element 140 or a border network element 150, and is configured to participate in the techniques presented herein. The networking device includes a network interface unit in the form of a plurality of network ports 1010-1015, a processor Application Specific Integrated Circuit (ASIC) 1020 that performs network processing functions, one or more processors 1030 (e.g., microprocessors or microcontrollers), and memory 1040. The memory 1040 stores a flood suppression module 170, which may include instructions for suppressing ARP/ND messages, and a cross-domain host address module 180, which may include instructions to communicate with another network device in a different network domain about hosts in the different network domain. It is to be understood that, in certain examples, the network device may be a virtual (software-based) appliance.

The memory 1040 may include read only memory (ROM), random access memory (RAM), magnetic disk storage media devices, optical storage media devices, flash memory devices, electrical, optical, or other physical/tangible memory storage devices. Thus, in general, the memory 1040 may comprise one or more tangible (non-transitory) computer readable storage media (e.g., a memory device) encoded with software comprising computer executable instructions and when the software is executed (by the one or more processors 1030) it is operable to perform the operations described herein with reference to a leaf node.

In summary, the intra-domain techniques described herein remove ARP/ND flooding in DC fabric solutions by leveraging BGP control plane messages with special extended communities. Even with the elimination of ARP/ND flooding, hosts on the network can still discover silent/undiscovered hosts and host routes to direct communications toward these destination hosts. By leveraging the control plane, once an ARP/ND request has been initiated for a destination host, the leaf nodes suppress subsequent ARP/ND requests for that destination host, thereby avoiding a burst of ARP/ND flooding in the fabric when a host does not exist on the network (i.e., dead/unresponsive/rogue host). These techniques completely remove ARP/ND flooding/requests in VXLAN EVPN-based DC fabrics, and may be extended to other fabrics that do not carry MAC-IP bindings in the control plane. The techniques minimize ARP/ND messages within fabrics that do not store MAC-IP bindings in the control plane by only requiring targeted ARP/ND requests to the destination hosts, and only sending those requests after the destination host is discovered.

Additionally, the inter-domain techniques described herein extend early ARP/ND termination features across multiple disaggregated VXLAN EVPN domains. Extending the early ARP/ND termination features across network domains removes/reduces ARP floods within and across DC fabrics, which improves the DC fabric scalability and performance. The inter-domain techniques may be quickly implemented in existing deployments since they involve minimal software changes to the border network elements and do not involve any changes to the EVPN standard. Essentially, the border network elements of one domain trigger the border network elements of other domains to learn MAC-IP bindings present in the one domain. The border network elements also assist in keeping the MAC-IP bindings of the hosts synchronized under host migration/removal.

In one form, a computer-implemented method enables a first network node of a plurality of network nodes to discover a host route by leveraging a temporary host route on the control plane of the computer network. The first network node receives, from a source host, a request for a host route associated with a destination host. The first network node determines that it has not previously stored the host route associated with the destination host, and generates a temporary host route associated with the destination host. The first network node propagates the temporary host route across the plurality of network nodes, causing each respective network node among one or more other network nodes of the plurality of network nodes to discover if the destination host is connected to the respective network node.

In another form, an apparatus comprises a network interface unit, a memory, and a processor. The network interface unit is configured to communicate with a plurality of network nodes to relay traffic between hosts connected to one of the plurality of network nodes. The memory is configured to store host routes associated with the hosts connected to one of the plurality of network nodes. The processor is configured to receive from a source host via the network interface unit, a request for a host route associated with a destination host. The processor is also configured to determine that the host route associated with the destination host has not been previously stored in the memory. The processor is further configured to generate a temporary host route associated with the destination host and propagate the temporary host route across the plurality of network nodes. The temporary host route causes each respective network node among one or more other network nodes of the plurality of network nodes to discover if the destination host is connected to the respective network node.

In yet another form, one or more non-transitory computer readable media is provided with instructions to cause a processor of a first network node of a plurality of network nodes to discover a host route by leveraging a temporary host route on the control plane of the computer network. The instructions cause the processor to receive, from a source host, a request for a host route associated with a destination host. The instructions cause the processor to determine that the first network node has not previously stored the host route associated with the destination host, and generate a temporary host route associated with the destination host. The instructions cause the processor to propagate the temporary host route across the plurality of network nodes, causing each respective network node among one or more other network nodes of the plurality of network nodes to discover if the destination host is connected to the respective network node.

In a further form, a computer-implemented method enables border network nodes to propagate host routes across computer networks. A first border network node of a first computer network receives a message from a second border network node of a second computer network. The message includes an identification of a source host on the second computer network. The first border network node generates a first host route associated with the source host in a first control plane of the first computer network. The first host route is a first type of host route, and includes the identification of the source host. The first border network node determines whether the first control plane includes a second host route of a second type of host route. The second host route includes a network address of the source host. Responsive to a determination that the first control plane does include the second host route, the first border network node associates the network address of the source host along with the identification of the source host in the first host route.

In still another form, an apparatus comprises a network interface unit, a memory, and a processor. The network interface unit is configured to communicate with a plurality of network nodes on a first computer network and a border network node of a second computer network. The memory is configured to store host routes associated with the hosts connected to the first computer network or the second computer network. The host routes includes a first type of host route that includes an identification of a host and/or a second type of host route that includes a network address of the host. The processor is configured to receive a message from the border network node. The message includes an identification of a source host on the second computer network. The processor generates a first host route associated with the source host in a first control plane of the first computer network. The first host route is the first type of host route, and includes the identification of the source host. The processor determines whether the first control plane includes a second host route of the second type of host route. The second host route includes a network address of the source host. Responsive to a determination that the first control plane does include the second host route, the processor associates the network address of the source host along with the identification of the source host in the first host route.

In yet a further form, one or more non-transitory computer readable media is provided with instructions to cause a processor of a first border network node of a first computer network to propagate host routes from a second border network node of a second computer network. The instructions cause the processor to receive a message from the second border network node of the second computer network. The message includes an identification of a source host on the second computer network. The instructions cause the processor to generate a first host route associated with the source host in a first control plane of the first computer network. The first host route is a first type of host route, and includes the identification of the source host. The instructions cause the processor to determine whether the first control plane includes a second host route of a second type of host route. The second host route includes a network address of the source host. Responsive to a determination that the first control plane does include the second host route, the instructions cause the processor to associate the network address of the source host along with the identification of the source host in the first host route.

It is to be appreciated that the above examples are not mutually exclusive and may be combined in various arrangements. It is also to be appreciated that the above description is intended by way of example only. Various modifications and structural changes may be made therein without departing from the scope of the concepts described herein and within the scope and range of equivalents of the claims. In particular, any specific implementation details described using network fabrics, EVPN, VXLANs, and/or leaf/spine networks may be implemented using any protocol and/or topology that carries information between network elements.

What is claimed is:

1. A method comprising:
at a first network node of a network comprising a plurality of network nodes:
receiving, from a source host, a request for a host route associated with a destination host;
determining that the first network node has not previously stored the host route associated with the destination host;
generating an artificial host route associated with the destination host, wherein the artificial host route does not include a valid host route to reach the destination host;
responsive to a determination that the artificial host route will cause a second network node among the plurality of network nodes to determine the host route associated with the destination host that is connected to the second network node, suppressing the request from being sent from the first network node to any network node of the plurality of network nodes; and
propagating the artificial host route across a control plane of the network.

2. The method of claim 1, further comprising:
receiving, from the second network node, the host route of the destination host; and
storing the host route of the destination host at the first network node.

3. The method of claim 1, wherein the artificial host route causes the plurality of network nodes to, during a predetermined period of time, drop subsequent requests for the host route of the destination host.

4. The method of claim 3, further comprising, after the predetermined period of time, withdrawing the artificial host route to cause each respective network node of the plurality of network nodes to terminate further determination of whether the destination host is connected to the respective network node.

5. The method of claim 1, wherein receiving a request for the host route associated with the destination host comprises:
receiving data traffic directed from the source host to the destination host.

6. The method of claim 1, wherein propagating the artificial host route across the control plane of the network comprises:
sending the artificial host route according to a Border Gateway Protocol with a special extended community.

7. An apparatus comprising:
a network interface unit configured to communicate with a plurality of network nodes to relay traffic between hosts connected to one of the plurality of the network nodes:
a memory configured to store host routes associated with the hosts connected to one of the plurality of network nodes; and
a processor configured to:
receive from a source host via the network interface unit, a request for a host route associated with a destination host;
determine that the host route associated with the destination host has not been previously stored in the memory;
generate an artificial host route associated with the destination host, wherein the artificial host route does not include a valid host route to reach the destination host;
responsive to a determination that the artificial host route will cause a second network node among the plurality of network nodes to determine the host route associated with the destination host that is connected to the second network node, suppressing the request from being sent from the apparatus to any network node of the plurality of network nodes; and
propagate the artificial host route across a control plane of the network.

8. The apparatus of claim 7, wherein the processor is further configured to:
receive from the second network node via the network interface unit, the host route of the destination host; and
store the host route of the destination host in the memory.

9. The apparatus of claim 7, wherein the artificial host route causes the plurality of network nodes to, during a predetermined period of time, drop subsequent requests for the host route of the destination host.

10. The apparatus of claim 9, wherein the processor is further configured to, after the predetermined period of time, withdraw the artificial host route to cause each respective network node of the plurality of network nodes to terminate further determination of whether the destination host is connected to the respective network node.

11. The apparatus of claim 7, wherein the processor is configured to receive the request for the host route associated with the destination host by receiving data traffic directed from the source host to the destination host.

12. The apparatus of claim 7, wherein the processor is configured to propagate the artificial host route across the control plane of the network by causing the network interface unit to send the artificial host route according to a Border Gateway Protocol with a special extended community.

13. A method comprising:
at a first border network node of a first computer network:
receiving a message from a second border network node of a second computer network, wherein the message includes an identification of a source host on the second computer network;
generating, in a first control plane of the first computer network, a first host route associated with the source host, wherein the first host route is a first type of host route and includes the identification of the source host;
determining whether the first control plane includes a second host route, wherein the second host route is a second type of host route and includes a network address of the source host; and
responsive to a determination that the first control plane includes the second host route, associating the network address of the source host in the second host route with the identification of the source host in the first host route.

14. The method of claim 13, wherein the identification of the source host is a Media Access Control (MAC) address of the source host, and wherein the network address of the source host is an Internet Protocol (IP) address of the source host.

15. The method of claim 14, wherein the first computer network is a first domain of an Ethernet Virtual Private Network (EVPN), and wherein the second computer network is a second domain of the EVPN, and wherein the first domain and the second domain of the EVPN are connected by a Layer 2/3 Data Center Interconnect.

16. The method of claim 15, wherein the first type of host route is a Type 2 EVPN route, and wherein the second type of host route is a Type 5 EVPN route.

17. The method of claim 13 wherein the message is an Address Resolution Protocol (ARP) message sent to a destination host from the source host.

18. The method of claim 13, wherein the message is a Gratuitous Address Resolution Protocol (GARP) message sent by the second border network node on behalf of the source host.

19. The method of claim 18, wherein the GARP message is sent in response to a subnet being stretched across the first computer network and the second computer network.

20. The method of claim 18, wherein the GARP message is sent in response to the second border network node receiving a separate GARP message from the source host.

* * * * *